S. MYERSON.
ARTIFICIAL TOOTH.
APPLICATION FILED APR. 6, 1916.
1,196,970.
Patented Sept. 5, 1916.
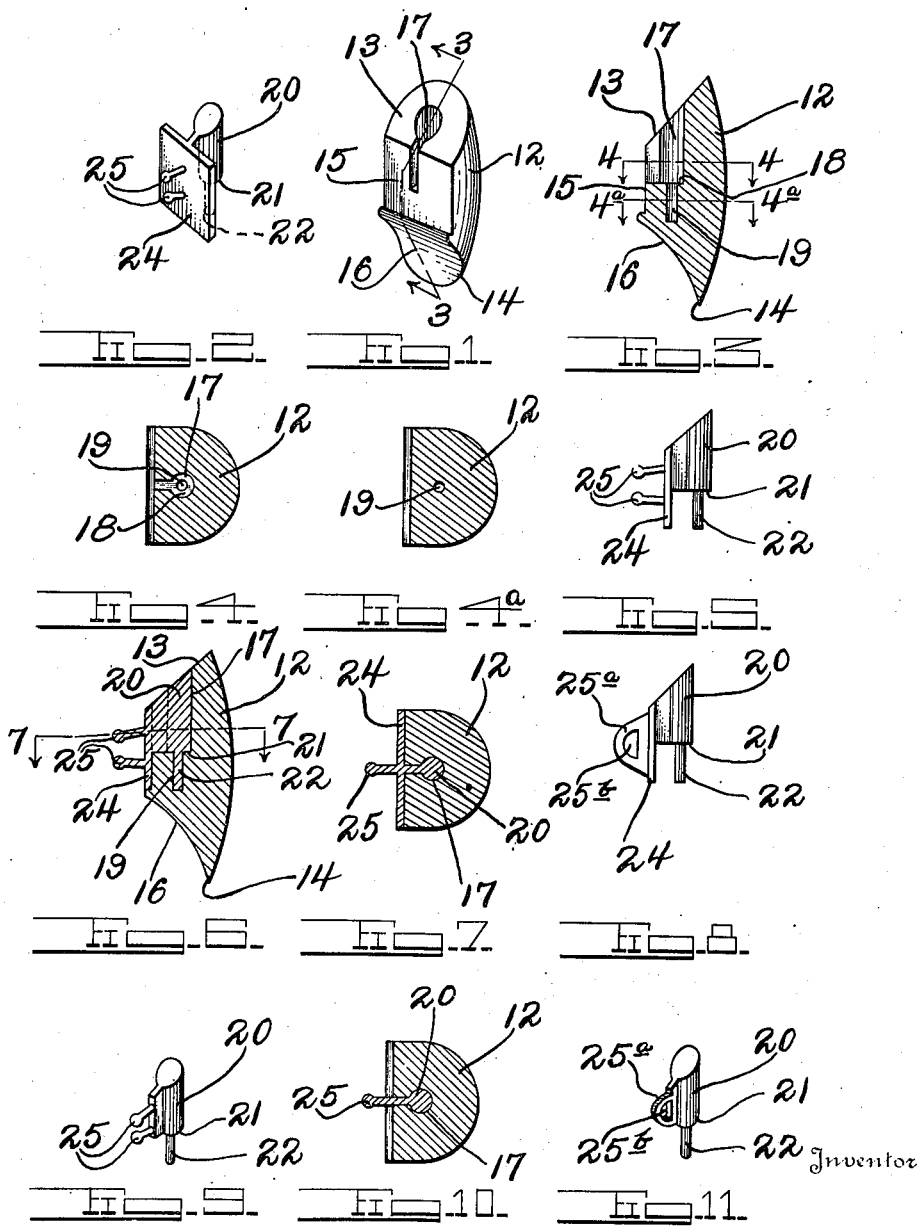

UNITED STATES PATENT OFFICE.

SIMON MYERSON, OF CAMBRIDGE, MASSACHUSETTS.

ARTIFICIAL TOOTH.

1,196,970.　　　　　Specification of Letters Patent.　　Patented Sept. 5, 1916.

Application filed April 6, 1916.　Serial No. 89,460.

*To all whom it may concern:*

Be it known that I, SIMON MYERSON, a citizen of the United States, residing at Cambridge, in the county of Middlesex and State of Massachusetts, have invented new and useful Improvements in Artificial Teeth, of which the following is a specification.

The object of this invention is to provide an artificial two part anterior tooth adapted for vulcanite work, and is embodied in a tooth comprising a porcelain body and a metallic tenon engaged therewith to resist forces of mastication, and provided with means projecting rearwardly from the lingual face of the tooth for engagement with a plate of vulcanite forming a part of the denture, the arrangement being such that in case of breakage of the porcelain body it can be readily removed from the tenon and replaced by another without removing the tenon from the vulcanite plate, and therefore without necessity of revulcanizing the latter.

Of the accompanying drawings forming a part of this specification: Figure 1 represents a perspective view of the porcelain body of my improved tooth; Fig. 2 represents a perspective view of the tenon and vulcanite engaging means associated therewith, including a metallic backing; Fig. 3 represents a section on line 3—3 of Fig. 1; Fig. 4 represents a section on line 4—4 of Fig. 3; Fig. 4ª represents a section on line 4ª—4ª of Fig. 3; Fig. 5 represents an edge view of the tenon and backing shown by Fig. 2; Fig. 6 represents a longitudinal section of the complete tooth; Fig. 7 represents a section on line 7—7 of Fig. 6; Fig. 8 represents a view similar to Fig. 5, showing a modification; Fig. 9 represents a perspective view of the tenon without the backing; Fig. 10 represents a view similar to Fig. 7, with the form of tenon shown by Fig. 9; Fig. 11 represents a perspective view of a modification of the tenon shown by Fig. 9.

The same reference characters indicate the same or similar parts in all the views.

In the drawings: 12 represents a porcelain tooth body having a ridge lap 13, an incisal edge 14, and a flat lingual face 15 separated from the incised edge by an inclined posterior face 16, forming one of the sides of the "bite" portion of the body.

The body 12 is provided with a socket extending from the ridge lap parallel with the lingual face, said socket being preferably composed of an enlarged outer portion 17 opening on the ridge lap and on a portion of the lingual face, and preferably keyhole shaped, the portion opening on the lingual face being an elongated narrow slot or lateral mouth extending from the ridge lap toward the incisal edge, and having a closed inner end relatively near the ridge lap. The portion 17 terminates at its inner end in a floor 18 facing toward the ridge lap. The socket also preferably has a reduced portion 19 extending from the floor 18 into the body of the tooth.

The socket is occupied by a metallic tenon preferably including a neck portion fitting said lateral mouth, and an enlarged portion 20 fitting the enlarged portion of the socket and having an inner end 21 bearing on the floor 18. The tenon also preferably includes a reduced portion 22 fitting the reduced portion of the socket. The portion of the tenon which includes said neck is preferably keyhole shaped to conform to the keyhole shape of the portion of the socket which includes said lateral mouth.

The socket and tenon are formed to coöperate in detachably securing the body 12 and in resisting forces of mastication, substantially as shown in my pending application filed March 10, 1916, Serial Number 83,272.

The tenon may be provided with a metallic backing 24 formed to bear on the lingual face 15, as shown by Figs. 2, 5, 6, and 8, or said backing may be omitted, as shown by Figs. 9, 10 and 11. The backing is integral with the tenon and projects from opposite sides of the neck portion thereof.

The tenon is provided with anchoring means projecting rearwardly from the lingual face and adapted to be embedded in a vulcanite holder or plate, and secured therein by the vulcanization of said plate.

In Figs. 2, 5, 6, 7, 9, and 10, I have shown anchoring means embodied in headed pins 25 formed either on the tenon provided with the backing, as shown by Figs. 2, 5, 6, and 7, or on the tenon from which the backing is omitted, as shown by Figs. 9 and 10, said pins and said reduced portion 22, being preferably of substantially the same thickness. In Figs. 8 and 11, I have shown anchoring means embodied in an ear 25ª having an orifice 25ᵇ to receive a portion of the plastic vulcanite, said ear and said reduced portion 22, being preferably of substantially the same thickness.

The tenon is preferably cemented to the body prior to the vulcanization of the plate, the plate-engaging or anchoring means being subsequently embedded in the vulcanite plate and secured by the vulcanization thereof.

The invention is particularly intended for the six anterior teeth or incisors, and enables these teeth to be used in combination with the usual diatoric back teeth in complete dentures, or separately in partial dentures of the vulcanite type.

In case of breakage of the body 12 it can be replaced and secured by cement without removing the tenon from the vulcanite plate, an operation which can be quickly performed without revulcanization.

The described improvement embodied in a two-part tooth especially designed for vulcanite work, and including a holding part embodied in the tenon 20, with or without the backing 24, and provided with rearwardly projecting anchoring means permanently engaging a vulcanite plate, and an outer part or body engaged with said holding part and replaceable thereon while the holding part is engaged with the plate, obviates the inconvenience, expense, and loss of time involved by the common practice of submitting the denture to revulcanization. In other words, the improved tooth, as a whole, contains within itself means permitting the convenient replacement of a broken body by a substitute body without revulcanization of the vulcanite plate.

Having described my invention, I claim:

1. An artificial tooth comprising a body having a ridge lap and a socket extending from the ridge lap into the body, said socket being provided with a narrow mouth extending rearwardly to the lingual face, and a tenon shaped to substantially fill and closely fit the socket and provided with a reduced portion extending rearwardly through said mouth, the rear edge of said reduced portion being provided with rearwardly projecting anchoring means of substantially the same thickness as said reduced portion and shaped to be embedded in a vulcanite plate.

2. An artificial tooth comprising a body having a ridge lap and a socket extending from the ridge lap into the body, said socket being provided with a narrow mouth extending rearwardly to the lingual face, and a tenon shaped to closely fit the socket and provided with a reduced portion extending rearwardly through said mouth, the rear edge of said reduced portion being provided with rearwardly projecting anchoring pins shaped to be embedded in a vulcanite plate.

3. An artificial tooth comprising a body having a ridge lap and a socket extending from the ridge lap into the body, said socket being provided with a narrow mouth extending rearwardly to the lingual face, and a tenon shaped to closely fit the socket and provided with a reduced portion extending rearwardly through said mouth, the rear edge of said reduced portion being provided with rearwardly projecting anchoring means shaped to be embedded in a vulcanite plate, the reduced portion of said tenon being also provided with lateral wings forming a backing shaped to bear on the lingual face.

In testimony whereof I have affixed my signature.

SIMON MYERSON.